Patented Oct. 31, 1922.

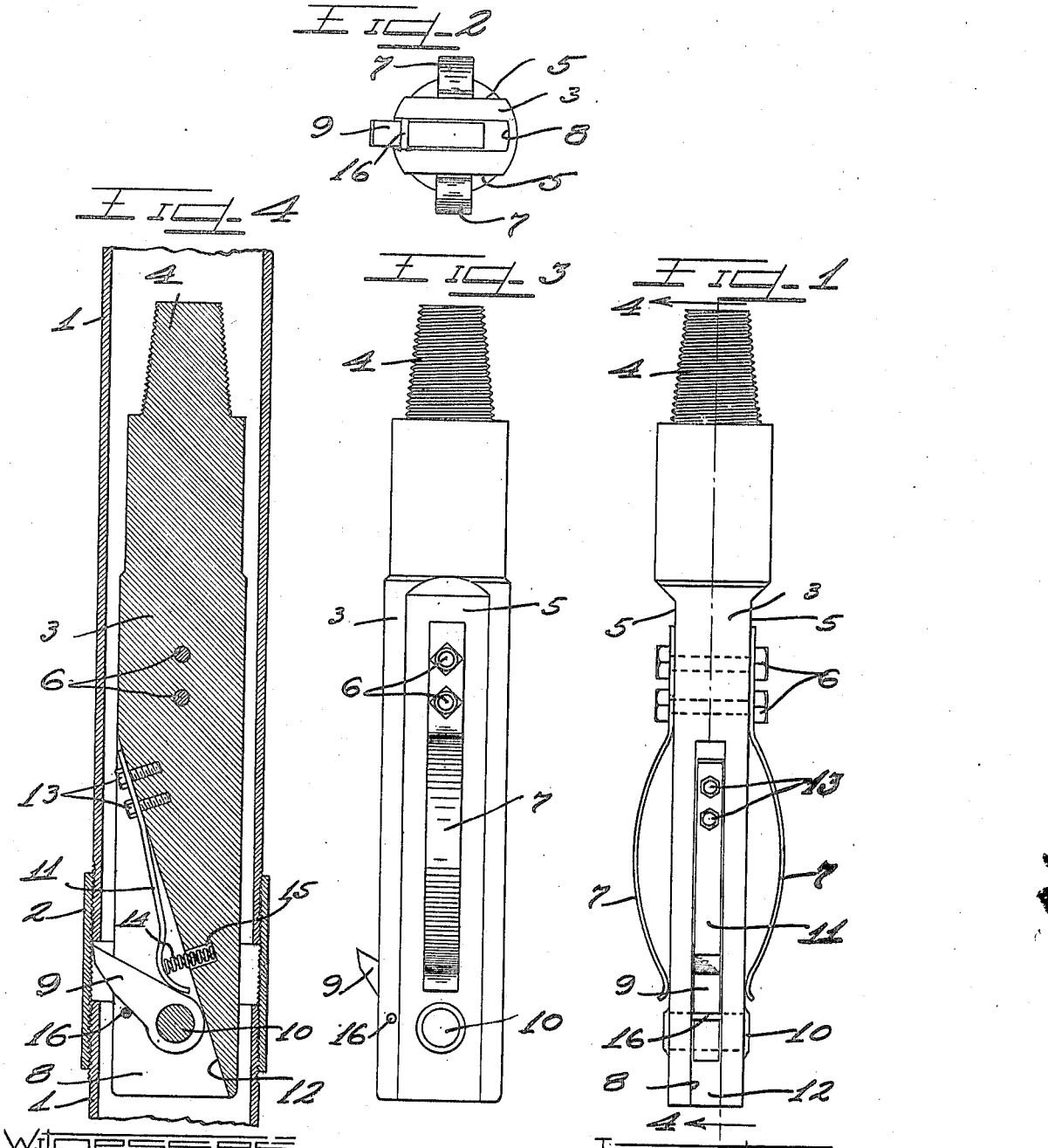

1,433,722

UNITED STATES PATENT OFFICE.

FRANK J. HINDERLITER, OF TULSA, OKLAHOMA.

CASING RIPPER.

Application filed September 17, 1921. Serial No. 501,349.

*To all whom it may concern:*

Be it known that I, FRANK J. HINDERLITER, a citizen of the United States, and a resident of the city of Tulsa, county of Tulsa, and State of Oklahoma, have invented certain new and useful Improvements in a Casing Ripper; and I do hereby declare that the following is a full, clear, and exact description of the same, reference being had to the accompanying drawings, and to the numerals of reference marked thereon, which form a part of this specification.

This invention relates more particularly to an improved type of a deep well casing ripper adapted to be lowered into the casing of a deep well and then operated to cut or rip the lower end of a casing sleeve out of a coupling or collar connecting the adjacent ends of a pair of casing sleeves.

It is an object of this invention to provide a casing ripper adapted to separate the sleeves of a deep well casing in a comparatively short time.

It is also an object of the invention to provide a casing ripper wherein a spring impelled cutting dog is used to rip the lower end of a deep well casing sleeve where it is threaded into a coupling.

A further object of the invention is the construction of a casing ripper wherein a slotted shank is provided with exterior springs for the purpose of frictionally holding the device in position with a casing sleeve to permit a cutting dog supported in the slotted shank to engage beneath the lower end of the sleeve to permit the same to be cut or ripped from a casing coupling.

It is an important object of this invention to provide a deep well casing ripper of simple and effective construction adapted to be conveniently lowered into position in a deep well casing and operated to cause separation of a plurality of connected casing sleeves in a comparatively short time.

Other and further important objects of this invention will be apparent from the disclosures in the drawings and specification.

The invention (in a preferred form) is illustrated in the drawings and hereinafter more fully described.

On the drawings:

Figure 1 is a front elevation of the casing ripper embodying the principles of this invention.

Figure 2 is a bottom plan view thereof.

Figure 3 is a side elevation of the device.

Figure 4 is a central longitudinal section of the casing ripper disposed within a deep well casing.

As shown on the drawings:

The reference numeral 1 indicates a pair of aligned tubes or sleeves having the adjacent ends thereof threaded into a connecting collar or coupling 2 to form part of a deep well casing.

The casing ripper comprises a body or shank 3 having integrally formed on the upper end thereof a threaded boss or nipple 4 by which the ripper may be attached to a string of tools and let down into the well casing 1. The shank 3 is cut away on opposite sides to afford flat surfaces 5. Bolts 6 project through the shank 3 and hold outwardly curved supporting springs 7 secured in place on the flat surfaces 5 of the shank. The lower ends of the springs 7 are free and rest against the shank surfaces 5. A slot 8 is provided in the lower end of the shank 3 and has mounted therein a cutting dog 9 one end of which is pivotally supported on a bolt 10 engaged through the lower portion of the shank. A plate spring 11 is provided in the shank slot 3 and has one end secured to an inclined surface 12 in the shank by means of screw bolts 13. The other end of the spring 11 is held projected against the cutting dog 9 by a coiled spring 14 seated within a notch 15, formed within the shank as illustrated in Figure 4. Projecting through the shank 3 below the cutting dog 9 is a stop pin 16. The pin 16 is provided in case it is desired to run the casing ripper down a large hole and then into a casing of small diameter down in the well.

The operation is as follows:

When it is desired to cut or rip a sleeve 1 from a deep well casing, the cutting dog 9 is forced into the shank slot 8 against the spring 11. The casing ripper is then lowered into the deep well casing by means of a string of tools or other suitable means until the spring impelled cutting dog reaches the lower end of a casing sleeve 1. At this point the springs 15 and 11 act to force the cutting dog outwardly beneath the lower end of the sleeve 1 as shown in Figure 4. The springs 7 frictionally contact the inner surfaces of the casing and act to hold the casing ripper supported in position.

With the ripper positioned within a deep well casing as illustrated in Figure 4, the ripper is drawn upwardly, whereby the cutting dog 9 cuts or rips the lower end of the coupling collar 2. When the upper end of the coupling collar 2 is reached the cutting dog 9 is projected outwardly by the springs 11 and 14 over the tip of the coupling collar and with the continued raising of the casing ripper, the cutting dog falls downwardly into the shank slot 8 allowing the ripper to be pulled out of the casing. In the operation above described, the pin 16 is omitted.

In case it is desired to first run the casing ripper down through a large hole and then into a deep well casing of less diameter the pin 16 is used for the purpose of supporting the cutting dog 9 in the position shown in Figure 4 so that the cutting dog will be in a position to properly enter the casing sleeve to be cut.

With the improved casing ripper herein described a string of connected casing sleeves can be ripped from their connecting coupling collars in a comparatively short time without injuring the coupling collars thereby permitting a new casing sleeve to be threaded into the coupling collar after a worn or damaged casing sleeve has been removed.

I am aware that numerous details of construction may be varied through a wide range without departing from the principles of this invention, and I therefore do not purpose limiting the patent granted otherwise than necessitated by the prior art.

I claim as my invention:

1. A casing ripper comprising a shank having a slot therein, means on said shank to permit the same to be lowered and raised in a deep well casing, resilient means on said shank for holding the same supported in position with a deep well casing, a cutter pivotally supported in said slot, springs in said slot for holding the cutter in projected cutting position, and a cutter supporting pin in said shank below the cutter.

2. A casing ripper embracing a slotted shank, a cutter pivotally mounted therein, a resilient member secured in said shank, and a spring in said shank for forcing the resilient member against said cutter to hold the cutter in projected cutting position.

3. A casing ripper embracing a shank, a cutter movably mounted therein, a resilient member secured in said shank, a pin in said shank to support the cutter in a projected cutting position, and means in said shank for holding the resilient member in contact with said cutter.

4. A casing ripper comprising a shank, a threaded boss thereon, supporting spring secured on the exterior of said shank, a cutter mounted in said shank, resilient means in said shank and a spring behind said means adapted to hold the cutter in projected cutting position.

5. A casing ripper embracing a shank, resilient means attached to said shank for centering it in the casing, a cutting dog pivotally mounted in said shank, and resilient means and means behind said resilient means adapted to force said cutting dog downwardly into cutting position.

In testimony whereof I have hereunto subscribed my name in the presence of two subscribing witnesses.

FRANK J. HINDERLITER.

Witnesses:
 C. A. MECHLING,
 G. E. COUSINS.